Patented May 12, 1936

2,040,460

UNITED STATES PATENT OFFICE 2,040,460

PROCESS FOR THE MANUFACTURE OF RUBBER CONVERSION PRODUCTS

Wilhelm Becker, Cologne-Mulheim, Ludwig Orthner, Leverkusen-I. G. Werk, and Alfred Blömer, Imbach, near Opladen, Germany, assignors to I. G. Farbenindustrie Aktiengesellschaft, Frankfort-on-the-Main, Germany No Drawing. Application February 23, 1933, Serial No. 658,269. In Germany February 25, 1932

7 Claims. (Cl. 260—1)

The present invention relates to a process of preparing rubber conversion products and to the new products obtainable by said process.

When it is desired to prepare rubber conversion products in rubber solutions on a technical scale, it is necessary to apply rather concentrated solutions, since otherwise the yield of rubber conversion products is too small to allow a satsifactory working up of the reaction mixtures. In order to obtain these concentrated solutions, the rubber has been, up to date, strongly masticated for several hours before being dissolved. By this masticating process the rubber becomes substantially more soluble in rubber solvents. This effect can be raised by subjecting the rubber before or during the masticating process to an oxidation process. Furthermore, attempts have been made to prepare rubber solutions of low viscosity by dissolving unmasticated rubber in a suitable solvent and then oxidizing the rubber in the solution. Rubber solutions of low viscosity, it is true, can thus be obtained. However, about 3% solutions of unmasticated rubber already possess so high a viscosity that they can be handled only with difficulty. Highly concentrated rubber solutions can therefore not be obtained by this process.

It is one feature of the present invention to provide a process according to which highly concentrated rubber solutions of low viscosity containing as much as 20% or more of rubber can be obtained in a convenient and cheap manner on a technical scale.

It is a further feature of the invention to provide a method of preparing rubber conversion products with the use of the above mentioned rubber solutions.

The method of manufacture of the present invention is to treat unmasticated rubber in a rubber solvent, such as benzine, benzene, toluene, xylenes, tetrachloromethane, tetrachloroethane etc. with oxygen gases containing free oxygen or compounds which are capable of splitting off oxygen under the conditions of working, such as alkali metal perborates, percarbonates, hydrogenperoxide etc., in the presence of a small amount of a metallic oxidizing catalyst, preferably an oxide, hydroxide or a salt of a heavy metal, such as copper, iron, zinc, cobalt, nickel, manganese etc.

The more specific method of working may, for example, be as follows:—

Unmasticated rubber, advantageously cut into small strips or pieces, is placed in a vessel containing the rubber solvent. A metallic oxidizing catalyst is then added and air or another gas containing free oxygen is contacted with the mixture, or an agent which is capable of splitting off oxygen under the conditions of working is added. Advantageously, the reaction mixture is heated, the best results being generally obtained at a temperature between about 30° C. and the boiling point of the reaction mixture. Lower and higher temperatures are likewise operable but inconvenient, since at low temperatures a rather long time is necessary, whereas at temperatures above the boiling point of the reaction mixture, the application of superatmospheric pressure will be unavoidable. The reaction can be accelerated by exposing the mixture to the action of active light rays. When working in the above manner rubber solutions of low viscosity and having a rubber content of 20% or even more can easily be obtained.

Preferred metallic oxidizing catalysts are those which are soluble in rubber dissolving solvents, such as copper oleate, copper linolenate, the copper salt of abietic acid, the copper compound of aceto acetic acid ester, the corresponding zinc-, iron-, cobalt-, nickel or manganese compounds, as far as they are available, etc.

As outlined above, the metallic oxidizing catalysts can be applied in a small amount, which should, however, advantageously exceed about 0.01% (metal content of the catalyst) of the rubber to be dissolved. Preferred amounts of the oxidizing catalysts are those between about 0.05 to about 2% (metal content calculated on the rubber). Larger amounts are likewise operable.

The concentrated rubber solutions obtained as described above can be used for the conversion of the rubber, contained in the same, into rubber conversion products of any desired kind. For example, the solutions may be treated with chlorine at normal or elevated temperature to form chlorinated rubbers in a manner known per se. Likewise the rubber solutions may be subjected to an ozonization process, treated with sulfonating agents in the presence or absence of aromatic hydrocarbons and/or hydroxy compounds, or they may be treated with agents yielding a cyclyzation of the rubber ($AlCl_3$, $POCl_3$, $ClSO_2OH$, for example). Furthermore, Friedel-Craft's reactions of the rubber with organic halogen compounds may be performed in the said solutions etc.

Means have thus become available to prepare rubber conversion products from highly concentrated rubber solutions of low viscosity without the necessity of subjecting the rubber to an inconvenient and expensive masticating process.

The following examples illustrate the invention, without, however, limiting it thereto:—

Example 1

In a vessel provided with a stirrer 4400 liters of carbon tetrachloride, 350 kgs. of unmasticated crepe and 3.5 kgs. of copper oleate are heated to boiling under a reflux condenser and maintained at that temperature while introducing air into the reaction mixture for about 25 hours. After cooling the clear, thinly viscous rubber solution thus obtained to 20–25° C., 1050 kgs. of chlorine are introduced at a temperature of about 20–35° C., and finally, part of the carbon tetrachloride is distilled off in order to remove the excess of chlorine and the hydrochloric acid which is formed. Thereupon the solution is precipitated with methanol while stirring. In this manner 860 kgs. of chlorinated rubber are obtained with a chlorine content of about 63%. A 30% by weight solution of this chlorinated rubber is easily paintable and yields films, which show a better elasticity than those of chlorinated rubbers obtained according to methods hitherto known.

Example 2

400 kgs. of crepe, 3500 liters of carbon tetrachloride and 4 kgs. of freshly prepared copper linolenate are placed in a suitable vessel provided with an electrical light source and with a stirring device. The mixture is then heated to boiling and, while stirring and exposing it to the electric light, a stream of air is bubbled through the mixture for about 30 hours. After cooling, a thinly liquid rubber solution is obtained, which may be used for the manufacture of chlorinated rubber as described in Example 1.

Example 3

100 kgs. of crepe are heated to boiling with 1000 liters of xylene and 5 kgs. of copper oleate while introducing air, until a test portion yields only a very slight precipitation or none at all upon the addition of acetic acid anhydride. The solution obtained can be directly used for sulfonating the rubber contained in the same. On the other hand, the xylene can also be distilled off to a far-reaching extent and the highly viscous rubber solution mixed with 300 kgs. of acetic acid anhydride. 100 liters of concentrated sulfuric acid are then added while stirring and cooling to a temperature of 0° C.

After neutralization and evaporation a clear, water soluble substance is obtained, which can be applied for wetting and dispersing purposes.

Example 4

To a rubber solution obtained from 45 kgs. of crepe as described in Example 3 and which is liberated to a far-reaching extent from the solvent, 65 kgs. of phenol are added. Into this solution 100 kgs. of concentrated sulfuric acid are dropped while cooling with ice. Thereupon the reaction mass is heated on the water bath, until a test portion is clearly soluble in water. After pouring on ice, neutralizing with caustic soda solution and, if necessary, evaporating, a clear water soluble substance resistant to acids and alkalies and possessing good wetting properties is obtained.

Example 5

2200 liters of carbon tetrachloride, 200 kgs. of unmasticated rubber and 2 kgs. of copper oleate are heated, while stirring, in an autoclave of 3000 liters content to a temperature of 65–70° C. Air is then forced into the autoclave, until a pressure of 3 atmospheres (superatmospheric) is obtained. After 6 hours heating the reaction mixture is cooled and the thinly liquid rubber solution can then be used for the manufacture of rubber conversion products of any desired kind.

We claim:—

1. In a process of preparing rubber conversion products the step which comprises intimately contacting free oxygen with a liquid mixture containing pieces of unmasticated, unoxidized and undissolved rubber and a rubber solvent in the presence of a metallic oxidizing catalyst until the rubber has dissolved.

2. In a process of preparing rubber conversion products the step which comprises intimately contacting a compound capable of liberating oxygen under the working conditions with a liquid mixture containing pieces of unmasticated, unoxidized and undissolved rubber and a rubber solvent in the presence of a metallic oxidizing catalyst until the rubber has dissolved.

3. In a process of preparing rubber conversion products the step which comprises intimately contacting free oxygen with a liquid mixture containing pieces of unmasticated, unoxidized and undissolved rubber and a rubber solvent in the presence of a metallic oxidizing catalyst which is soluble in the rubber solvent, at a temperature between about 30° C. and the boiling point of the reaction mixture, until the rubber has dissolved.

4. Process as claimed in claim 3 wherein the catalyst is used in amount, based upon its metal content, exceeding about .01% of the rubber present.

5. In a process of preparing rubber conversion products the step which comprises intimately contacting air with a liquid mixture containing pieces of unmasticated, unoxidized and undissolved rubber and a rubber solvent in the presence of a metallic oxidizing catalyst until the rubber has dissolved.

6. In a process of preparing rubber conversion products the step which comprises intimately contacting, by agitation, air with a liquid mixture containing pieces of unmasticated, unoxidized and undissolved rubber and a rubber solvent, in the presence of a catalyst selected from the group consisting of copper oleate, copper linolenate and the copper salt of abietic acid, at the boiling point of the reaction mixture until the rubber has dissolved, the catalyst used amounting, based upon its metal content, to between about .05% and about 2% of the rubber present.

7. A process as claimed in claim 1 wherein the solution of oxidized rubber obtained is subjected to one of the known conversion reactions.

WILHELM BECKER.
LUDWIG ORTHNER.
ALFRED BLÖMER.